US 6,634,379 B2

(12) United States Patent
Asadi et al.

(10) Patent No.: US 6,634,379 B2
(45) Date of Patent: Oct. 21, 2003

(54) SWITCHING VALVE WITH FLOW DIRECTION-DEPENDENT CROSS-SECTION

(75) Inventors: Hassan Asadi, Schweinfurt (DE); Gerald Fenn, Pfersdorf (DE); Hans Luksch, Kirchlauter (DE)

(73) Assignee: Mannesmann Sachs AG, Schweinfurt (DE)

( * ) Notice: Subject to any disclaimer, the term of this patent is extended or adjusted under 35 U.S.C. 154(b) by 107 days.

(21) Appl. No.: 09/991,472

(22) Filed: Nov. 21, 2001

(65) Prior Publication Data
US 2002/0078997 A1 Jun. 27, 2002

(30) Foreign Application Priority Data
Nov. 22, 2000 (DE) .......................... 100 58 136

(51) Int. Cl.[7] .............................. F16K 15/00; F16F 9/34
(52) U.S. Cl. ................. 137/512.1; 188/322.15
(58) Field of Search ................ 137/512.1; 188/282.5, 188/282.6, 322.13, 322.15

(56) References Cited

U.S. PATENT DOCUMENTS

| 4,460,074 A | * | 7/1984 | Muller et al. | 188/322.15 |
| 4,895,229 A | * | 1/1990 | Kato | 188/322.15 |
| 5,261,448 A | | 11/1993 | Furuya et al. | 137/513.5 |
| 5,316,113 A | * | 5/1994 | Yamaoka | 188/322.15 |
| 5,325,942 A | * | 7/1994 | Groves et al. | 188/322.15 |
| 6,079,440 A | * | 6/2000 | Fenn et al. | 137/493.9 |
| 6,129,005 A | * | 10/2000 | Asadi et al. | 92/128 |
| 6,276,498 B1 | * | 8/2001 | Kirchner | 188/322.15 |
| 6,336,536 B1 | * | 1/2002 | Fenn et al. | 188/322.15 |
| 6,540,052 B2 | * | 4/2003 | Fenn et al. | 188/322.15 |

FOREIGN PATENT DOCUMENTS

DE 40 25 115 2/1992

* cited by examiner

Primary Examiner—John Rivell
(74) Attorney, Agent, or Firm—Cohen, Pontani, Lieberman & Pavane

(57) ABSTRACT

Switching valve with a valve body, which separates two working spaces filled with a fluid. The valve body has pass-through openings which are covered except for an inlet cross-section, where the inlet cross-section is controlled by a switching disk as a function of the direction of flow in the switching valve. Between the switching disk and the inlet cross-section, at least one spacer disk is provided, which has at least one opening, which communicates with the inlet cross-section, where the opening has a larger two-dimensional area than the inlet cross-section.

6 Claims, 8 Drawing Sheets

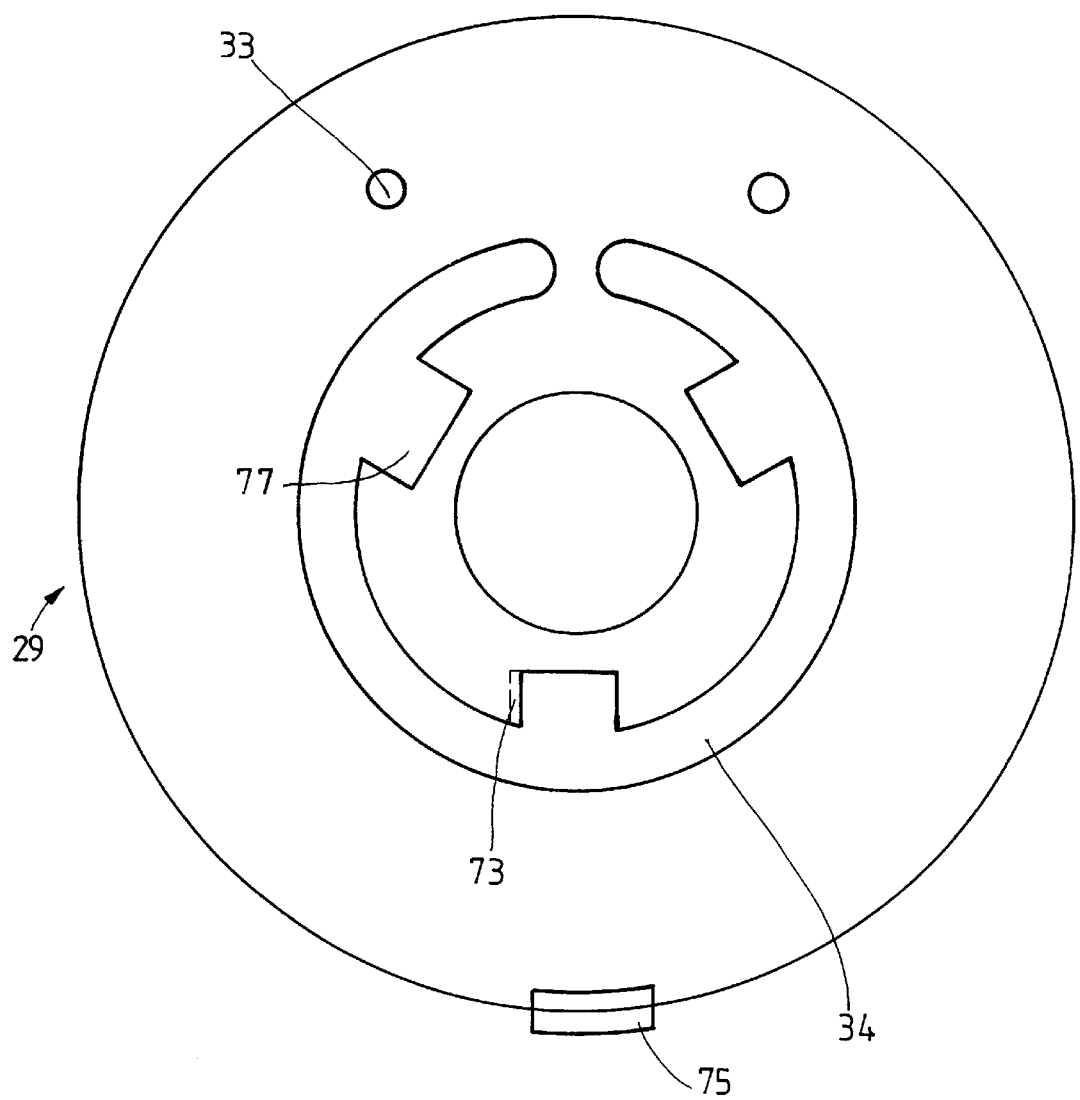

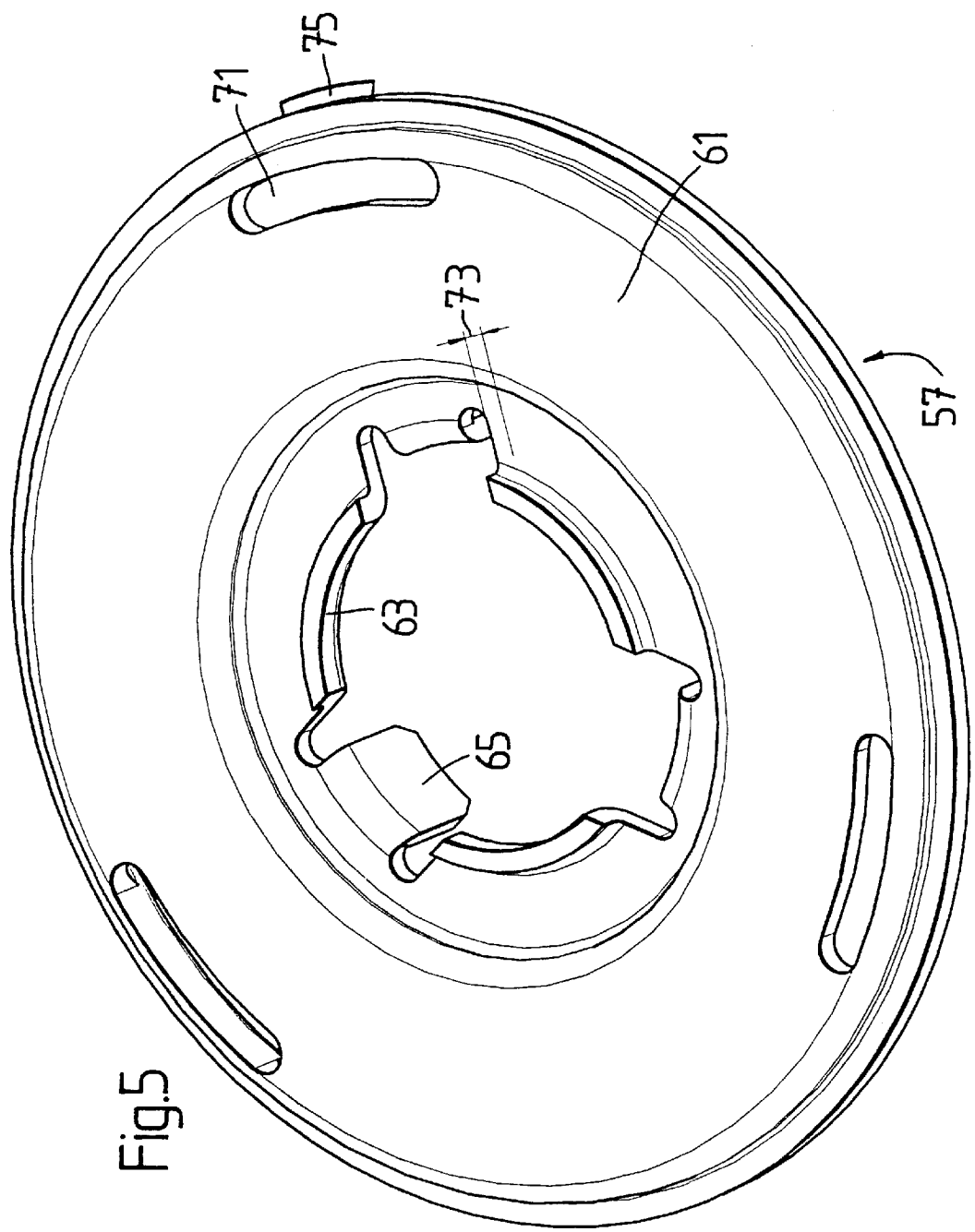

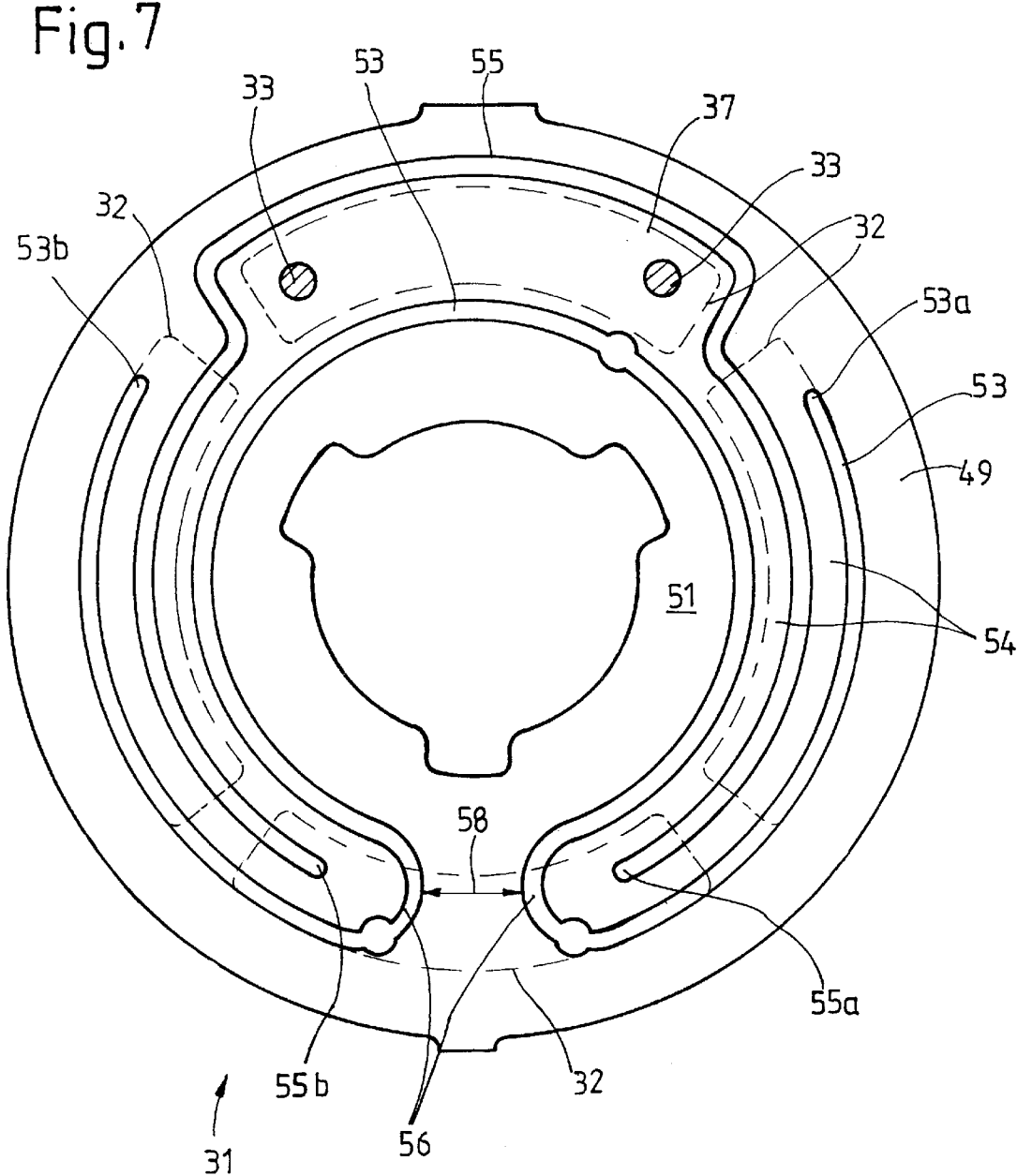

SWITCHING VALVE WITH FLOW DIRECTION-DEPENDENT CROSS-SECTION

BACKGROUND OF THE INVENTION

1. Field of the Invention

The invention pertains to a switching valve with a valve body separating two working spaces filled with fluid. The valve body has pass-through openings which are covered except for an inlet opening having a cross-section which is controlled by a switching disk as a function of the direction of flow in the switching valve.

2. Description of the Related Art

DE 40 25 115 describes a damping valve with a damping valve body, where elevated damping valve body areas are formed on the base body of the damping valve. These elevated area form valve contact surfaces, through which channels, which are covered by valve disks, extend. At least one ring-shaped valve disk is provided on the valve contact surfaces, which disk has at least one inlet cross-section in alignment with a pass-through channel. The inlet cross-section is covered by a switching disk, which can rise from the valve disk when damping medium from the pass-through channel flows against it in the axial direction of the valve body. This design of a directionally-dependent inlet cross-section, although good in principle, nevertheless suffers from the disadvantage that adhesive forces can cause the switching disk to remain stuck on the valve body. One possible way of counteracting these adhesive effects is to roughen the contact surfaces, either those on the valve body or those on the valve disk. Although experiments have shown this measure does lead to an improvement, the results are still not satisfactory.

U.S. Pat. No. 5,261,448 describes a switching valve with a valve body, which separates two working spaces filled with a fluid from each other, where pass-through openings, which are covered at least partially by a number of valve disks, are provided in the valve body. The open cross-section of the pass-through openings is controlled by a switching disk as a function of the direction of flow. This switching disk has spring sections extending in the circumferential direction, at least one cover surface, and clamping surfaces, which pretension the switching disk against the switching valve outside the cover surfaces and the spring elements, where the minimum of one cover surface is kept in a fixed position with respect to at least one pass-through opening. The limited spring section undergoes deformation in the transverse direction, and thus a low spring rate can be achieved by making the spring section as narrow as possible in the circumferential direction. This, however, in incompatible with the requirement for strength.

SUMMARY OF THE INVENTION

The object of the invention is to improve a switching valve with an inlet cross-section, i.e., a switching valve which operates in a directionally dependent manner, in such a way that the smallest possible forces are sufficient to produce the switching movement of the valve elements which release the cross-section of the inlet and also so that the valve is securely closed when pressure is exerted in the opposite direction. The valve is also to be designed so that it operates reliably and has the greatest possible fatigue strength.

The object is accomplished by providing at least one spacer disk between the switching disk and the cross-section of the inlet opening. The spacer disk has at least one opening which communicates with the cross-section of the inlet, the surface area of this opening being larger than the cross-section of the inlet.

The key advantage associated with the use of the spacer disk is that the surface on which the pressure acts to lift the switching disk can be significantly increased without the need to change the size of the cross-section of the inlet opening. The dimensions of the surface on which the pressure acts are completely independent of the cross-section of the inlet opening.

In addition, the switching disk itself can be made of much thicker material, even though the forces which push it open are weaker. As a result, the fatigue strength of the switching disk can be significantly increased.

The large openings in the spacer disk reduce the contact area with the valve disk which must be lifted together with the switching disk from the spacer disk by the incoming flow. This reduction in the contact area also reduces the adhesive forces which can develop. The switching disk can also rest directly on the spacer disk.

So that the openings can have the largest possible cross-sections while at the same time the possibility of a hydraulic short-circuit between the cross-section of the inlet opening and the downstream working space can be avoided, the spacer disk is kept in a fixed position with respect to the cross-section of the inlet opening. The inlet cross-section can be pressed into the valve body or be formed by a valve disk equipped with a gap corresponding to the desired inlet cross-section.

In cases where the switching disk rests directly on the spacer disk, the switching disk is provided with clamping surfaces, which are separated from each other by openings, and with cover surfaces. The cover surfaces have spring sections, which enable them to rise relative to the clamping surfaces. The openings in the spacer disk are aligned with at least one cover surface.

The size of the opening can also be made larger than that of the cover surfaces of the switching disk by providing the spacer disk with additional openings in the area of at least one of the spring sections.

So that the largest possible openings in the spacer disk can be realized, the openings in the spacer disk and the cover surfaces in the switching disk extend in the circumferential direction.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 4 shows a throttle disk as an isolated part;

FIG. 5 shows a retaining disk as an isolated part;

FIG. 7 shows another switching disk as an isolated part; and

DETAILED DESCRIPTION OF THE PRESENTLY PREFERRED EMBODIMENTS

Figure 1:
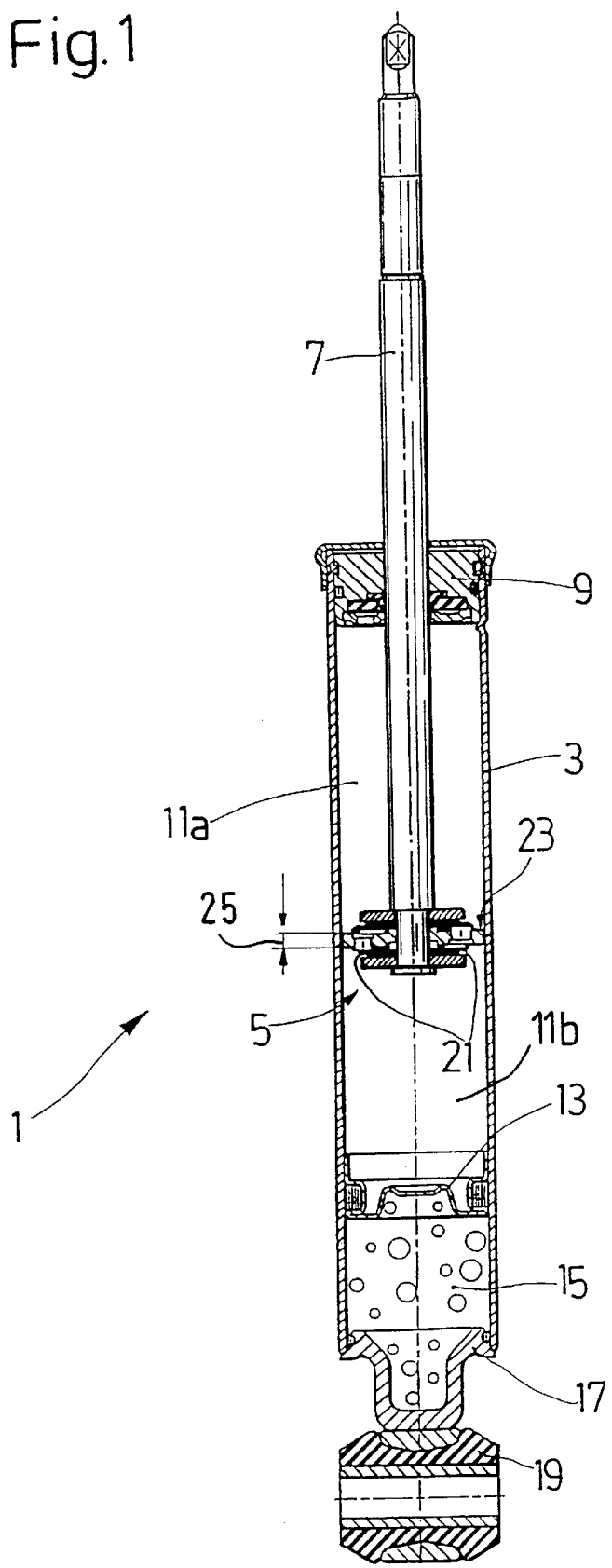
FIG. 1 shows an example of a design of a vibration damper.

FIG. 1 shows by way of example a piston-cylinder assembly 1 in a design for a single-tube vibration damper. In principle, the invention can also be applied to other types of piston-cylinder assemblies such as pneumatic springs, etc.

The single-tube vibration damper 1 consists essentially of a pressure tube 3, in which a piston 5 with freedom to move in the axial direction is provided, the piston being attached to a piston rod 7. At the exit end of the piston rod 7, a piston rod guide 9 seals off a working space 11, filled with a damping medium, the working space being separated from a gas space 15 by a separating piston 13. The bottom 17 of the gas space is provided with a mounting lug 19.

When the piston rod moves, damping medium is displaced through damping valves 21 in the piston 5. A piston ring 23, which covers a circumferential surface 25 on the piston 5, prevents the medium from flowing around the sides of the piston.

Figure 2:
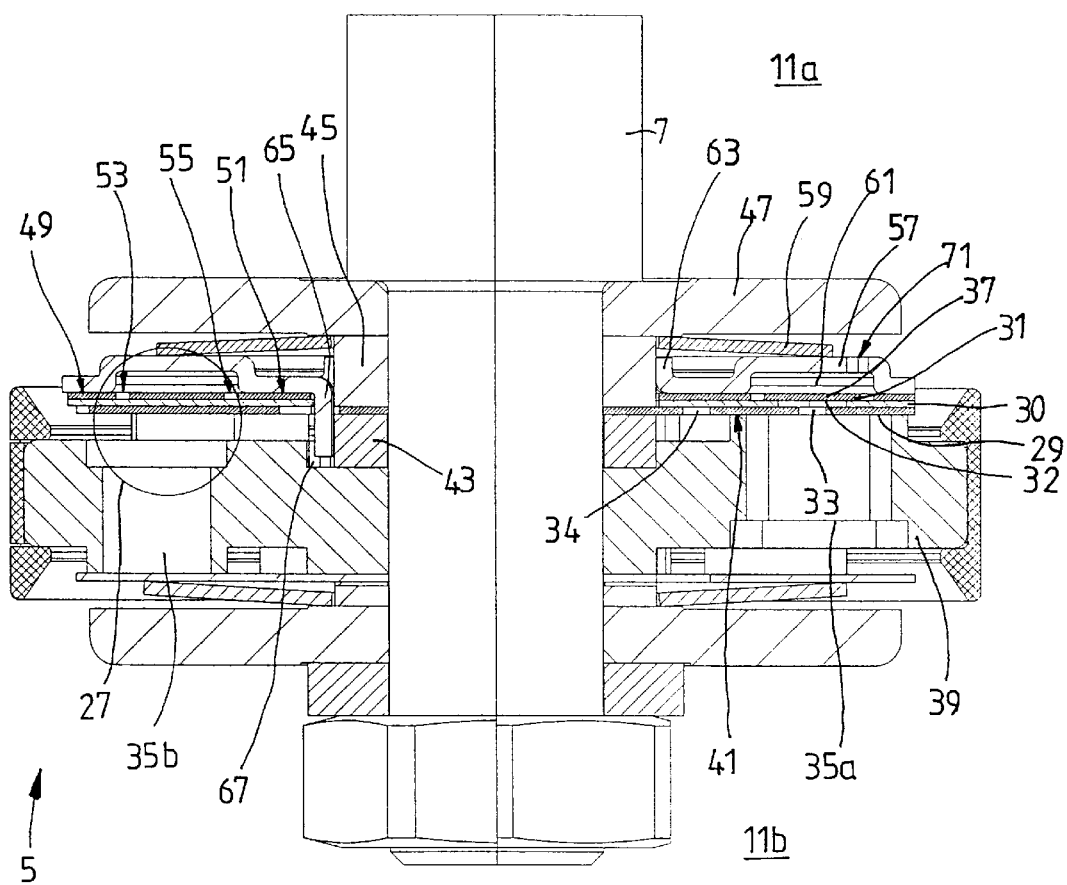
FIG. 2 shows a valve body in detail.

FIG. 2 shows the piston 5 of the vibration damper 1 as an isolated part with a switching valve 27 according to the invention, which in this embodiment consists of a throttle disk 29 in conjunction with a spacer disk 30 and a switching disk 31. At least one inlet cross-section 33 is provided in the throttle disk, this cross-section being oriented toward a pass-through openings 35a, 35b. In the spacer disk, at least one opening 32 is provided, which opening communicates with the pass-through opening 35a, 35b. The two-dimensional area of the minimum of one opening 32 is considerably larger than that of the pass-through openings 35a, 35b. The opening or openings 32 in the spacer disk 30 is/are covered by a cover surface 37 of the switching disk 31. In principle, the invention can also be applied to the bottom valve of a vibration damper or to other concrete applications.

The switching valve 27 is part of the damping valve 21 in the piston 5 of the vibration damper, which damping valve has a valve body 39, which connects the two working spaces 11a, 11b by way of the pass-through openings 35a; 35b. The pass-through openings open out at valve contact surfaces 41, on which the outer area of the throttle disk 29 rests. In the radially inner area, a contact ring 43 is inserted or pressed into the valve body, its contact surface lying in a plane with the valve contact surface 41, so that the throttle disk stays flat over its entire surface. The throttle disk 29 is centered by its inside diameter on a pin extending from the piston rod 7. If desired, the contact ring 43 and the valve contact surface 41 can be machined together at the desired height in a single step. The throttle disk has a C-shaped opening 34 (see FIG. 4) extending in the circumferential direction and can thus be elastically deformed, in which case the outer area, which rests on the valve contact surface, rises, whereas the inner area is held in place on the pin of the piston rod by a clamping ring 45 in conjunction with a stop collar 47.

The switching disk 31 resting on the spacer disk 30 has an outer clamping surface 49 radially outside the cover surface 37, and an inner clamping surface 51 radially inside the cover surface 37. These clamping surfaces are separated by openings 53; 55, as a result of which the cover surface can rise from the spacer disk 30 in the axial direction of the valve body 39. The switching disk is centered by its inner diameter, which is also in contact with the clamping ring.

To limit the extent to which the cover surface 37 of the switching disk 31 can rise, a retaining disk 57 is placed on the clamping surfaces 49; 51. This retaining disk is pretensioned in turn by a spring element 59, which in this case is a disk spring. The retaining disk 57 has a recess 61 at least in the area above the cover surface 37 of the switching disk 31. This recess provides the free space required to accommodate the rise of the cover surface (see the left half of the cross-section). Guide segments 63, serving as radial guides, are formed on the inside diameter of the retaining disk, facing the stop collar 47. In the other direction, form-locking segments 65 are provided, which pass through the switching disk, the spacer disk, and the throttle disk and engage in a mating profile 67 of the valve body, specially designed to accept the connecting segments.

Flow connections 71, which connect the recess 61 with the upper working space 11a, are machined into the base 69 of the recess. These flow connections are situated outside the surface of the spring element 59.

When the damping medium flows out of the working space 11b and through the pass-through openings 35a toward the switching valve 27, the throttle disk 29 is subjected to pressure over an area equal to the cross-section of the pass-through openings 33. Small pressures cannot lift the throttle disk from the valve contact surfaces against the force of the spring element 59. The opening 32 in the spacer disk allows the medium to flow up as far as the cover surface 37 of the switching disk 31 and provides a pressure-actuated area under the cover surface 37 which is much larger than the area of the pass-through opening 33. In these cases, only the cover surface 37 of the switching disk will be lifted from the spacer disk 30, so that damping medium can flow into the recess 61 and onward through the flow connections 71 into the working space 11a.

When greater pressures occur, the throttle disk 29 is lifted from the contact surfaces, as a result of which the damping valve 21 goes into action. The switching disk 31 and the retaining disk 57 are also lifted. When the flow proceeds in the opposite direction, the cover surface is pushed by the pressure in the recess 61 onto the throttle disk, so that the damping medium can flow only through the pass-through openings 35a, 35b into the working space 11b.

Figure 3:
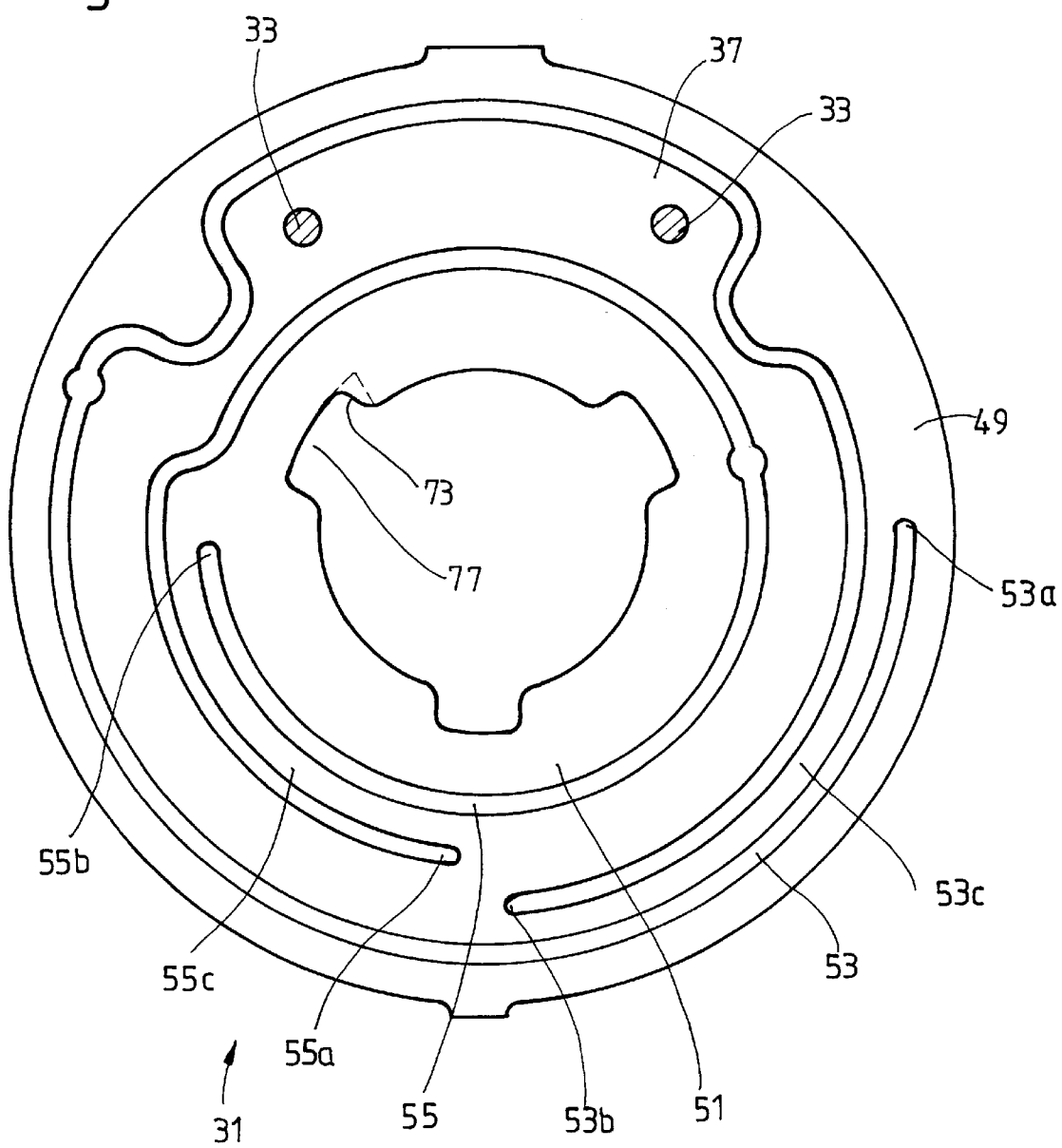
FIG. 3 shows a switching valve as an isolated part.

FIG. 3 shows the switching disk 31 as an isolated part. The switching disk has an outer opening 53, which is designed as a spiral extending around an angle of approximately 450°. Between its starting point 53a and its ending point 53b, the spiral-shaped opening forms the spring section 53c, which extends in the circumferential direction. It lies in the same flat plane as the other parts of the surface of the switching disk. The greater the distance between the starting and ending points in the circumferential direction, the longer the spring section and thus the lower the spring rate of the spring section. The inner opening 55, which is further inward in the radial direction, also has the shape of a spiral, and its circumferential angle is comparable or equal to that of the outer opening 53. Between a starting point 55a and an ending point 55b of the inner spiral-shaped opening, an inner spring section 55c extending in the circumferential direction is again formed. If we imagine the outer and inter clamping surfaces 49, 51, which lie outside and inside the spiral-shaped openings, as stationary relative to the cover surface 37, the cover surface can rise from the plane as the spring sections bend like leaf springs. The spring sections keep the cover surface pretensioned toward the throttle disk at all times. Even though this force may be relatively weak, the cover surface will still always move back toward the throttle disk, and the valve will exhibit a defined closing behavior.

The starting and ending points of the spiral-shaped openings 53; 55 are all in the same half of the switching disk, so that the largest possible cover surface 37 can be obtained. To make it easier to understand the design, the inlet cross-sections 33 in the cover surface have been superimposed.

FIG. 4 shows the throttle disk 29 as an isolated part with its two inlet cross-sections 33. So that the throttle disk can be aligned with the pass-through openings in the valve body 39, the inside diameter is designed with a profile with a deviation at a certain point 73. Otherwise, the switching disk 31 has the same profile as the throttle disk 29. The profiling is designed as a set of notches 77. The inlet cross-sections 33 in the throttle disk 29 are arranged symmetrically with respect to the point on the profile with the deviation 73, so that it is impossible under any circumstances for the inlet cross-section to be installed improperly with respect to the pass-through openings 35a; 35b in the valve body. So that the throttle disk can undergo elastic deformation under comparatively weak forces, the inner area is separated from the edge area by the C-shaped opening 34.

As a supplement to FIG. 2, FIG. 5 shows the retaining disk 57. In this diagram, the form-locking segments 65, which pass through the switching disk, the spacer disk, and the throttle disk, are more readily visible. The previously mentioned profile deviation 73 is also present in the form-locking segments. It can also be seen that the flow connections are designed as slots extending in the circumferential direction. The recess 61 extends completely around the circumference.

To facilitate the insertion of the retaining disk, the switching disk, and the throttle disk during the assembly process, these disks can have notches 75 or similar markings, which show how they are to be oriented for installation.

Figure 6A:
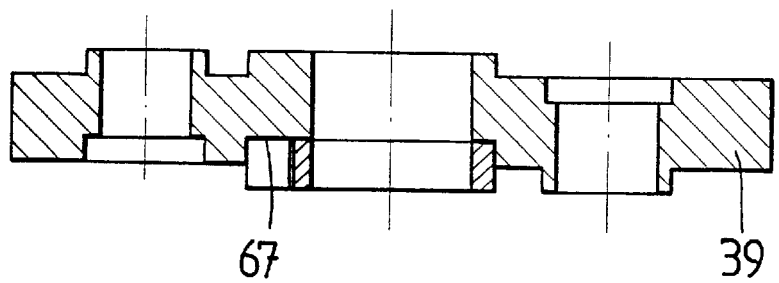
FIG. 6A is an axial cross-section of the valve body.
Figure 6B:
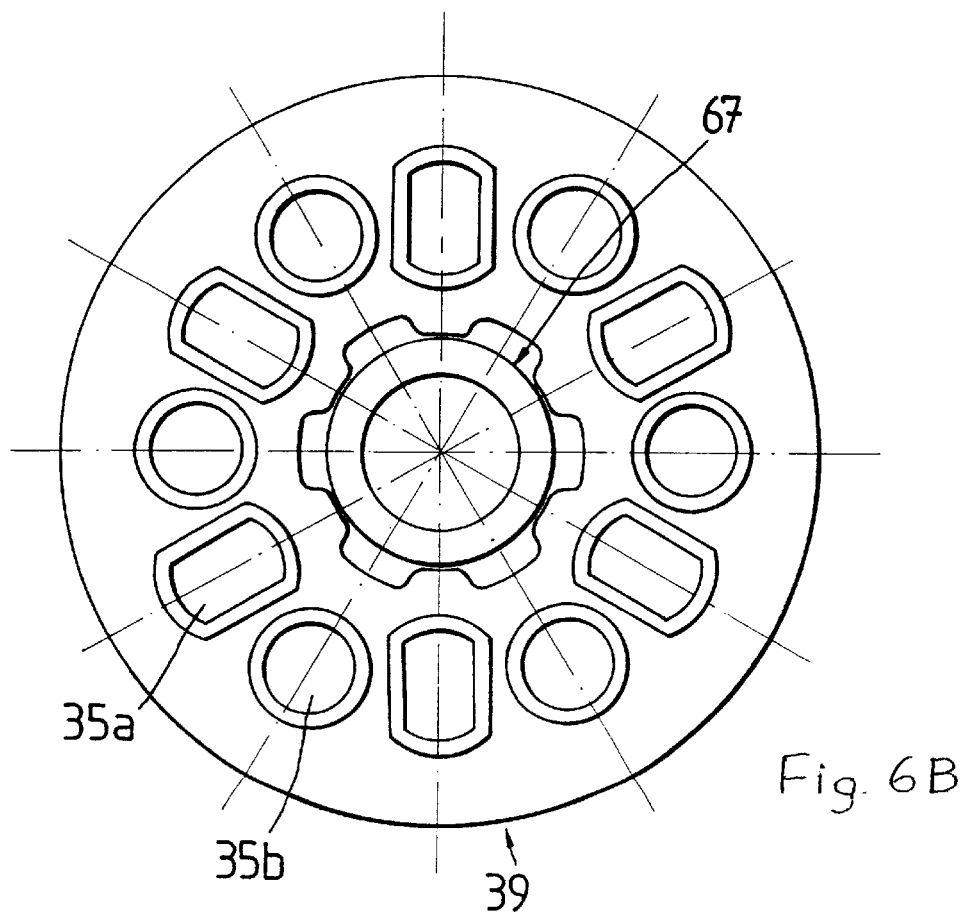
FIG. 6B is a plan view of the valve body.

FIGS. 6A and 6B show the mating profile 67 in the valve body, which enters into a form-locking connection with the form-locking segments of the retaining disk 57 and thus orients the entire disk assembly.

In a design with relatively small pass-through openings 35a; 35b, it is possible under certain conditions to omit the throttle disk 29, if the inner or outer opening in the switching disk 31 is in the area of the valve contact surface. The other opening in this case then has a crescent-shaped area above the pass-through opening 35, which forms the inlet cross-section 33, although care must be taken to ensure that the switching disk is not so elastic that it can be pushed into the inlet opening by the pressure of the medium when the flow is coming from the direction of the working space 11a.

FIG. 7 shows a modified switching disk 131. Again two openings 153; 155 are used, which separate the outer and the inner clamping surfaces 149; 151 from the cover surface 137 and also form spring sections. The difference from the design shown in FIG. 3 is that an outer opening 153, which has various sections extending in the circumferential direction, includes half-coiled sections 154, which define areas for a C-shaped opening 155. The outer opening 153 also has a C-shaped design, concentric to the inner opening, and between the half-coiled sections it extends radially inside the inner opening 155. As a result of the C-shaped design of the openings 153, 155 with the end points 153a; 153b; 155a; 155b, a connecting web 158 is created, which is diametrically opposite the cover surfaces 137. Overall, the openings 153, 155 are symmetric to the connecting web 158.

As can be seen from the exemplary description, the openings 153; 155 are arranged on three concentric partial circles. As a result, the surface area for the remaining outer clamping surface 149 is increased, which therefore has greater strength.

Figure 8:
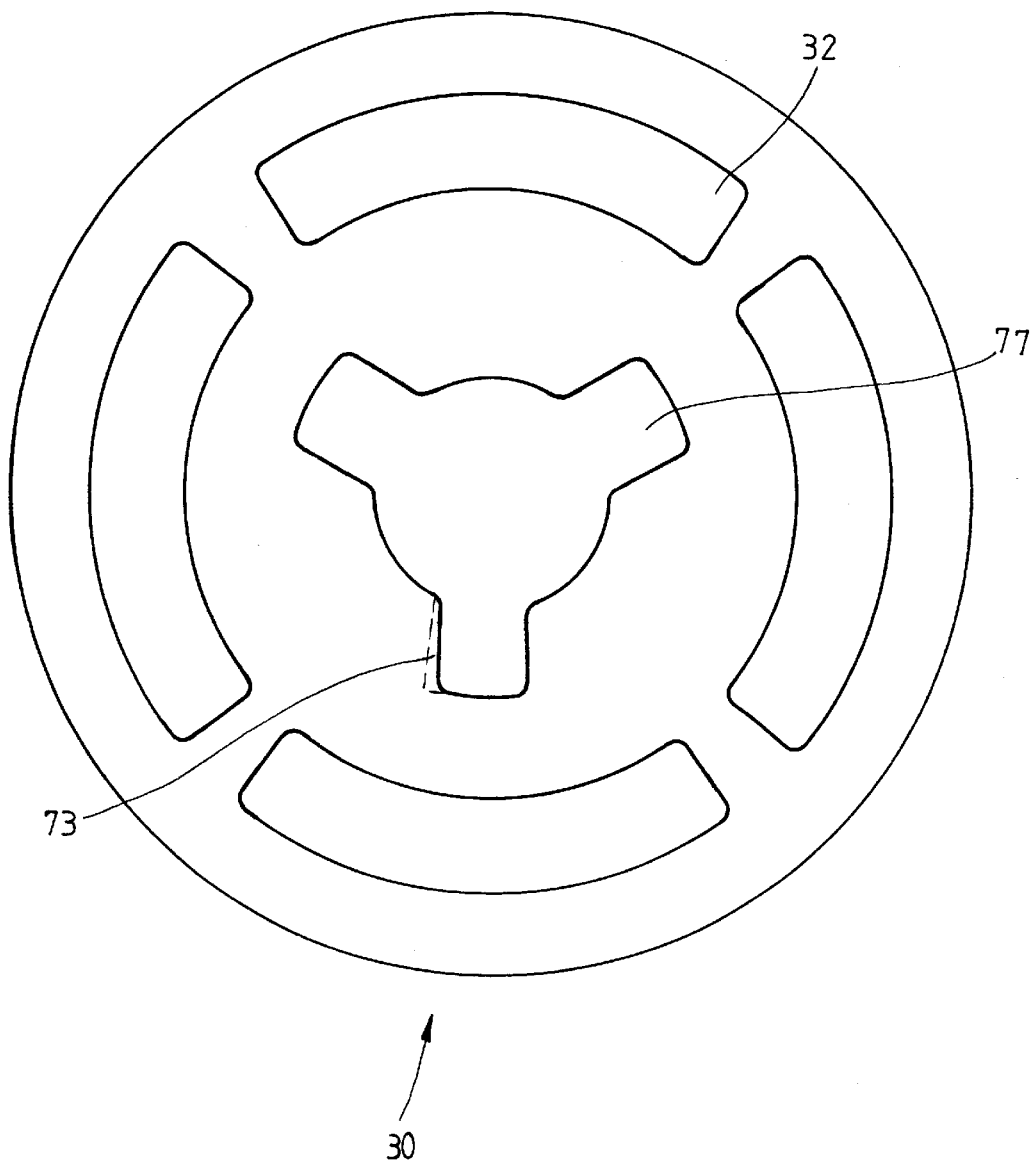
FIG. 8 shows a spacer disk as an isolated part.

FIG. 8 shows the spacer disk 30 as an isolated part. The inner profile corresponds to that of the switching disk 29. Several openings 32, which are smaller in the radial and circumferential directions than the cover surface 37 of the switching disk, are arranged in the circumferential direction. As can be seen from FIG. 7, the openings can also be situated in the area of the spring elements 54, which correspond to the half-coiled sections 54. This has the effect of bringing about a further increase in the surface of the switching disk on which the pressure is able to act.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A switching valve comprising
    a valve body for separating two working spaces filled with a fluid from each other, said valve body comprising pass-through openings,
    means for covering said pass-through openings, said means having therein at least one inlet opening having a cross-section over at least one pass-through opening,
    a switching disk for controlling the cross-section of the inlet opening as a function of the direction of flow of fluid through the pass-through openings, said switching disk being located over said means for covering said pass-through openings, and
    a spacer disk located between the switching disk and the cross-section of the inlet opening, said spacer disk having therein at least one opening which communicates with the cross-section of the inlet opening, said opening in said spacer disk having a surface area which is larger than the cross-section of the inlet opening.

2. Switching valve as in claim 1 wherein said spacer disk is kept in a fixed position with respect to said inlet cross-section.

3. Switching valve as in claim 1 wherein said switching disk comprises
    an inner clamping surface,
    an outer clamping surface,
    openings between said inner and outer clamping surfaces, said openings defining spring sections,
    at least one cover surface connected to said spring sections so that said cover surface can rise and fall relative to said clamping surfaces, said at least one cover surface being aligned with said openings in said spacer disk.

4. A switching valve as in claim 3 wherein said spacer disk has a plurality of said openings over at least one of said spring sections.

5. A switching valve as in claim 3 wherein said openings in said spacer disk and said at least one cover surface in the switching disk extend in the circumferential direction.

6. A switching valve as in claim 1 wherein said means for covering said pass-through openings is a throttle disk.

* * * * *